United States Patent
Cancro et al.

(10) Patent No.: US 9,589,294 B2
(45) Date of Patent: Mar. 7, 2017

(54) LOCATION BASED ALERTS FOR SHOPPER

(71) Applicant: Wal-Mart Stores, Inc., Bentonville, AR (US)

(72) Inventors: Richard Neil Cancro, Portland, OR (US); Joel Bennett Acker, Jr., Brush Prairie, WA (US); Douglas James Pedley, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 329 days.

(21) Appl. No.: 13/748,178

(22) Filed: Jan. 23, 2013

(65) Prior Publication Data

US 2014/0207570 A1 Jul. 24, 2014

(51) Int. Cl.
*G06Q 30/02* (2012.01)
*G06Q 30/06* (2012.01)

(52) U.S. Cl.
CPC ..... *G06Q 30/0631* (2013.01); *G06Q 30/0255* (2013.01); *G06Q 30/0261* (2013.01); *G06Q 30/0271* (2013.01)

(58) Field of Classification Search
None
See application file for complete search history.

(56) References Cited

U.S. PATENT DOCUMENTS

| | | | |
|---|---|---|---|
| 5,729,697 A * | 3/1998 | Schkolnick et al. | 705/23 |
| 6,123,259 A * | 9/2000 | Ogasawara | 235/380 |
| 6,659,344 B2 | 12/2003 | Otto | |
| 6,869,013 B2 | 3/2005 | Allen | |
| 6,873,967 B1 | 3/2005 | Kalagnanam | |
| 6,928,343 B2 | 8/2005 | Cato | |
| 6,997,382 B1 * | 2/2006 | Bhri | 235/383 |
| 7,063,263 B2 * | 6/2006 | Swartz et al. | 235/472.02 |
| 7,107,221 B1 * | 9/2006 | Tracy et al. | 705/26.81 |
| 7,246,083 B2 | 7/2007 | Bibelnieks | |
| 7,653,594 B2 | 1/2010 | Davis | |
| 7,672,870 B2 | 3/2010 | Haines | |
| 8,054,180 B1 * | 11/2011 | Scofield et al. | 340/539.13 |
| 8,152,062 B2 | 4/2012 | Perrier | |

(Continued)

FOREIGN PATENT DOCUMENTS

JP 2005173842 A * 6/2005

*Primary Examiner* — David Stoltenberg
*Assistant Examiner* — Shawn Lillemo
(74) *Attorney, Agent, or Firm* — Howard & Howard Attorneys PLLC

(57) ABSTRACT

Systems and methods are disclosed herein for generating reminders to shoppers to purchase products. Using a customer's current location, products stocked at that location are identified and compared to the customer's purchase history. Items regularly purchased by the customer found among the products stocked at the location are identified. Upon departing the location without adding the product to an electronic shopping cart an alert may be generated to remind the customer to purchase the product. In some embodiment, an alert is generate for a product found in the purchase history if an elapsed time since purchase of the product exceeds an expiration period or purchase period for that product. The methods disclosed herein may be used in the context of a self-checkout using an electronic shopping cart and navigational aids to facilitate retrieval of items on a shopping list.

14 Claims, 8 Drawing Sheets

(56) References Cited

U.S. PATENT DOCUMENTS

| | | |
|---|---|---|
| 8,208,014 B2 | 6/2012 | Geiger |
| 8,538,807 B2* | 9/2013 | Dishneau et al. ......... 705/14.25 |
| 2002/0178013 A1* | 11/2002 | Hoffman et al. ................. 705/1 |
| 2005/0027443 A1* | 2/2005 | Cato ............................. 701/207 |
| 2005/0149391 A1* | 7/2005 | O'Shea et al. ................. 705/14 |
| 2009/0286548 A1* | 11/2009 | Coronel et al. ............ 455/456.1 |
| 2010/0106602 A1* | 4/2010 | Fuzell-Casey et al. ... 705/14.58 |
| 2011/0093339 A1* | 4/2011 | Morton ...................... 705/14.58 |
| 2012/0296751 A1* | 11/2012 | Napper ........................... 705/23 |
| 2013/0073405 A1* | 3/2013 | Ariyibi .......................... 705/17 |

\* cited by examiner

(12) United States Patent...

LOCATION BASED ALERTS FOR SHOPPER

FIELD OF THE INVENTION

This invention relates to systems and methods for facilitating in-store shopping using a mobile computing device.

BACKGROUND OF THE INVENTION

It can be frustrating for a consumer to not have items on hand when needed, such as staple foods like milk and produce or other common ingredients. On the other hand these items may be so common that they slip the mind of a consumer that runs to the store to pick up a specific item that is needed right away. In a like manner, a consumer might not think to purchase a product until it runs out, but the product may run out at an inconvenient time or a few days prior to a usual shopping trip. In any case, failure to purchase a commonly used item can cause frustration and inconvenience for a shopper.

The systems and methods described herein provide an improved approach for reminding customers to purchase commonly purchased items.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
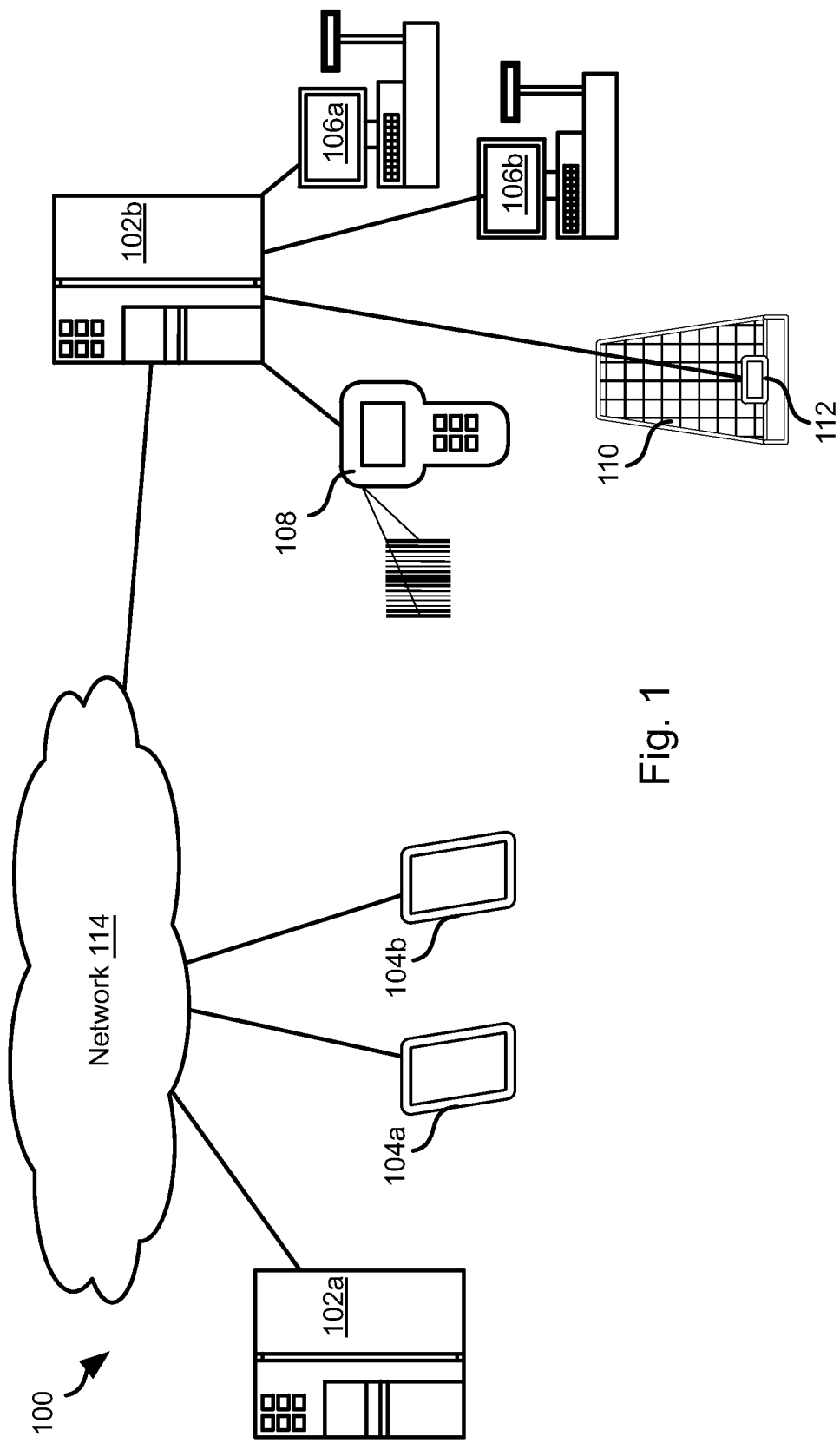
FIG. 1 is a schematic block diagram of a system suitable for performing methods in accordance with embodiments of the invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider). The embodiments disclosed herein may advantageously be implemented using a Java language and runtime environment or a Node.js implementation. In particular, functionality implemented on a server may be implementing using one or both of these methods.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102a that may be embodied as one or more server computers each including one or more processors that are in data communication with one another. The server system 102a may be in data communication with one or more customer computers 104a, 104b and one or more point of sale (POS) devices 106a, 106b. In the methods disclosed herein, the customer computers 104a, 104b are advantageously mobile devices such as a mobile phone or tablet computer. As known in the art, many mobile phones and tablet computers also include cameras that can be used to scan optical codes such as barcodes, two-dimensional bar codes (e.g. quick response (QR) codes), or textual information. In some embodiments, some or all of the methods disclosed herein may be performed using a desktop computer or any other computing device as the customer computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106a-106b may be located within a store and may be part of a POS network. In some embodiments, a POS 106a, 106b may be operable to process online transactions. In some embodiments, separate computers of the server system 102a may handle communication with the customer computers 104a, 104b and POS 106a, 106b.

In some embodiments, a server system 102a is a global server system 102a owned or controlled by a merchant operating multiple stores, such as over a large geographic area. Individual stores may have their own local server systems 102b that store or access data that is unique to a particular store or to stores in a particular region. In such embodiments, the local server system 102b may likewise be in data communication with the POS 106a, 106b associated with the server system 102b, such as the POS 106a, 106b of a store or stores in a region. In some embodiments, the server system 102b may be in data communication with a scanner 108 that is located in the store and available for use by customers. In some embodiments, a shopping cart 110 provided by a merchant may have secured thereto a mobile computing device 112, that may also incorporate a camera or other scanning device for detecting optical codes.

The server system 102b may communicate with the POS 106a, 106b, scanner 108, or mobile device 112, by means of a local network, such as a local wireless or wired network. The server system 102a may likewise communicate with the server 102b such as by means of a network 114. The network 114 may be embodied as a peer-to-peer wireless connection between devices, a connection through a local area network (LAN), WiFi network, the Internet, or any other communication medium or system. The user computing device 104a, 104b may likewise communicate with the server system 102a by means of the network 114. In some embodiments, the user computing devices 104a, 104b communicate with one or both of the POS 106a, 106b and server 102b by way of the server system 102a in order to implement the methods disclosed herein. In other embodiments, the user computing devices 104a, 104b communicate directly with these devices by means of a network such as a network local to a store or the network 110.

Figure 2:
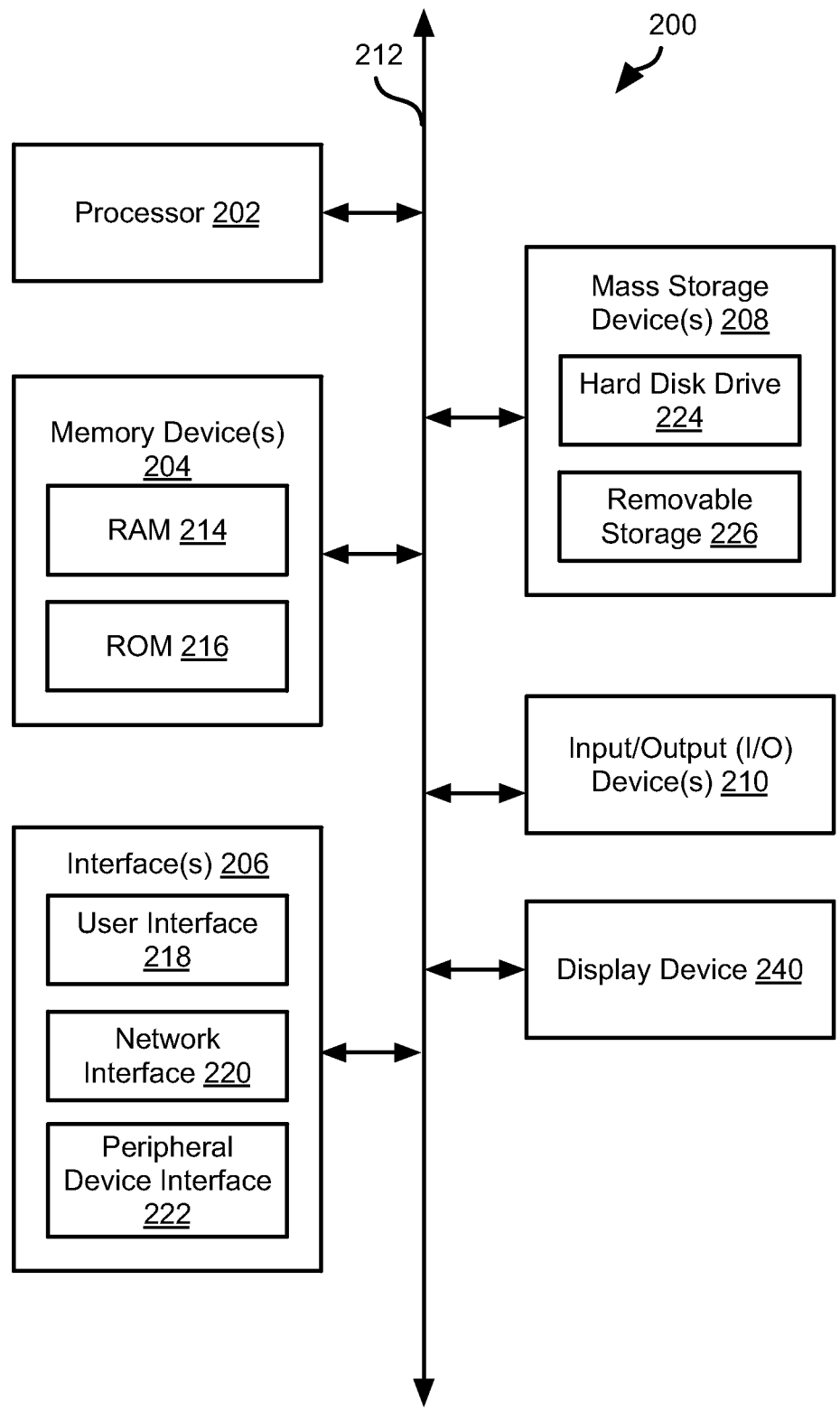
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102a, 102b, user computing device 104a, 104b, POS 106a, 106b, scanner 108, and mobile device 110, may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
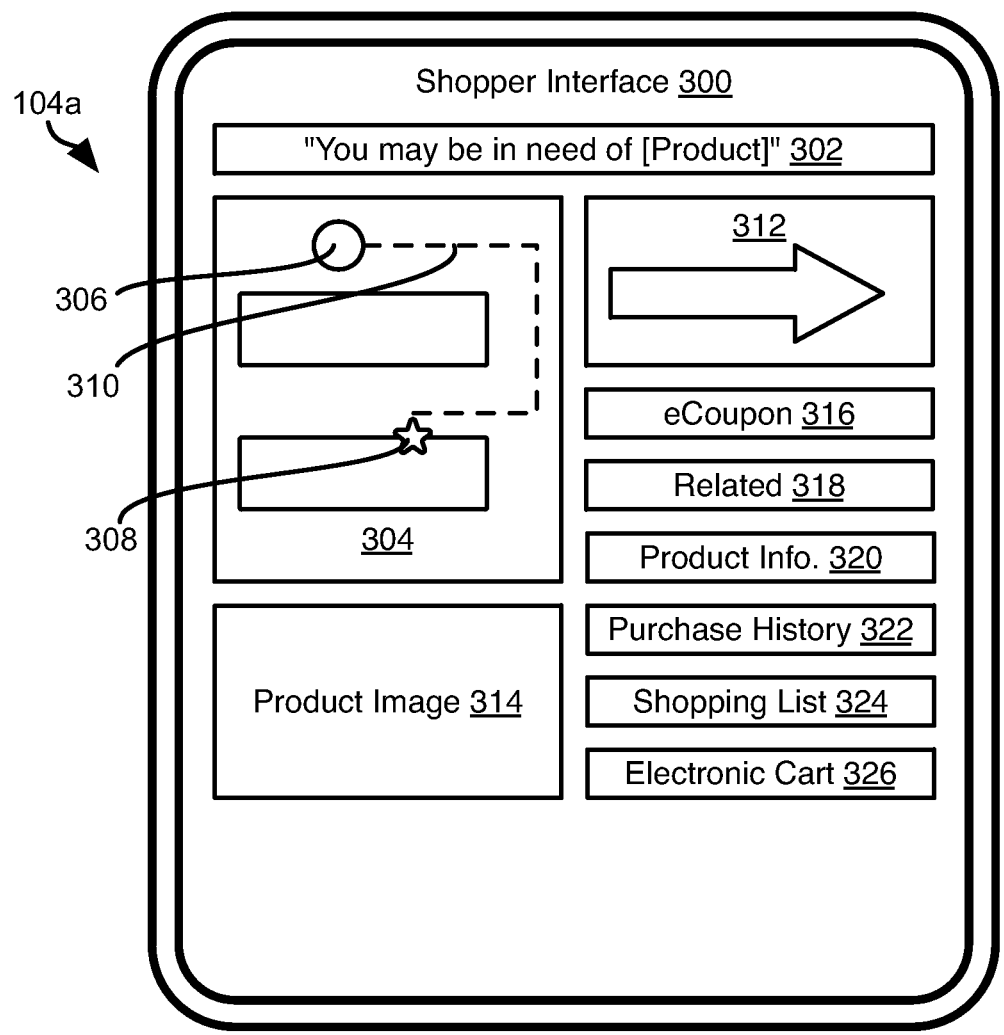
FIG. 3 is a schematic diagram of an interface suitable for use in methods in accordance with the invention may be implemented.

FIG. 3 illustrates an example interface 300 that may be displayed on a user computing device 104a, such as a smart phone, a scanner 108, or a mobile computing device 112 affixed to a shopping cart 110. For purposes of this disclosure, the methods are described with respect to a user computing device 104a, however references to a user computing device 104a hereinbelow may be replaced with references to a scanner 108 or mobile computing device 112.

The interface 300 may include an indicator 302 that communicates a message to a customer with respect to a product, such as an alert generated according to the methods described herein. As will be described in greater detail hereinbelow, the indicator 302 may display a message suggesting that a customer add a nearby item to a cart. Accordingly, the indicator 302 may display a message "you may be in need of [product]," "your recently purchased [product] has expired, would you like to purchase more," "your recently purchased [product] will expire in [N] days, would you like to purchase more," or "based on your past purchases you may want to purchase [product] within the next [N] days." The manner in which the message of the indicator 302 is generated is described in greater detail hereinbelow.

For a product identified in the indicator 302, other information relating to that product may also be displayed. For example, a map 304 may indicate a current location 306 of the customer, a location 308 of the product, and a path 310 leading the customer to the product. The interface 300 may also include a simple indicator 312 of a direction that the customer should turn or travel in order to reach the product from the customer's current location, where the indicator 312 is updated as the customer's current location changes.

One or more items of other information relating to the product may also be displayed, such as a product image 314, an electronic coupon 316 for the product, and information 320 or an interface element 318 for invoking display of information for other products related to the product, including promotions for these other products. The interface 300 may also display product information 320 or provide an interface element 320 for displaying other product information, such as a product description, comments from users of the product, reviews, expert reviews, how-tos, recipes, or other information relating to a product. As will be described in greater detail below, alerts may be generated in accordance with a purchase history of a customer for a product. Accordingly, the interface may display or provide a user interface element 322 for invoking display of the purchase history for a product. The purchase history may include a description of past purchases or a graph or other data derived from analysis of past purchases, such as a purchase period or purchase frequency for the product.

In some embodiments, the methods described herein may be used in combination with systems and methods for providing electronic shopping lists and navigation aids for retrieving items on a shopping list. Accordingly, the interface 300 may display or include an interface element 324 for invoking display of a shopping list, adding the product to a shopping list, or invoking navigational aids for retrieving items of a shopping list.

In some embodiments, the methods described herein may be used in combination with systems and methods for providing an electronic shopping cart and checkout using an electronic shopping cart. Accordingly, the interface 300 may include an interface element 326 for invoking addition of the product to an electronic shopping cart or display of an interface for managing an electronic shopping cart.

The interface 300 may display information for a single product. In some embodiments, alerts may be generated for multiple products in accordance with the methods disclosed herein. In such embodiments, a user may be presented with a list of products or list of indicators 302 for products that may be selected to invoke display of the interface 300 for that product.

Figure 4A:
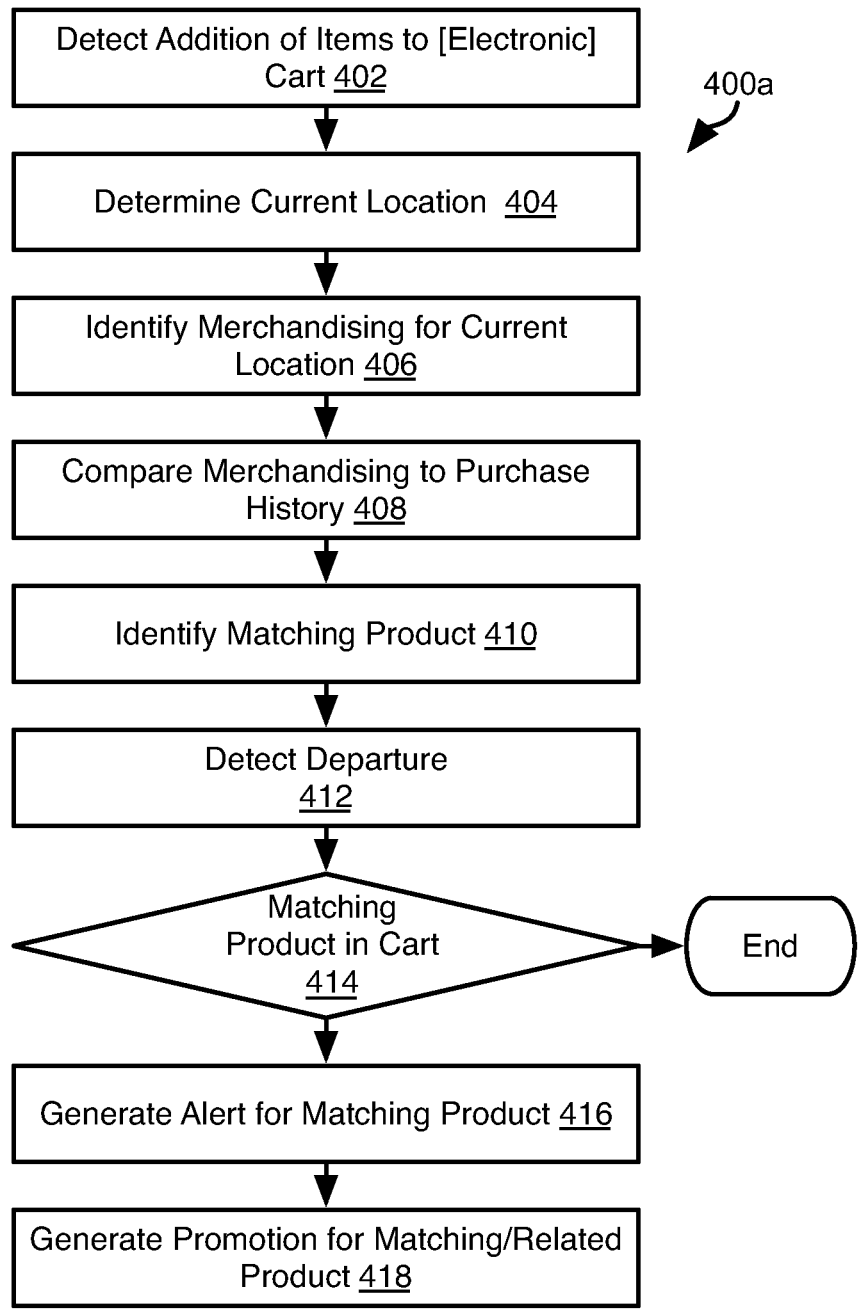
FIGS. 4A-4C are process flow diagrams for adding in-store items to an electronic shopping cart in accordance with an embodiment of the invention.

FIG. 4A illustrates a method 400a that may be executed in order to select products for which to generate alerts, such as by means of an indicator 302 in combination with some or all of the other interface elements of the interface 300. The method 400a may be executed on the user computing device 104a, the server system 102a, or the server system 102b. Alternatively, implementation of the steps of the method 400a may be distributed in any manner between these devices.

The method 400a may include detecting 402 additions of items to a cart, such as an electronic shopping cart of a customer. Where addition of items to an actual shopping cart is detected, items may include radio frequency identification (RFID) tags that enable the user computing device 104a to detect items that are in the cart. Where the cart is an electronic shopping cart, items may be added to the cart by scanning an optical code associated with the product using the user computing device 104a or otherwise expressly adding items to the cart by means of text entry or selecting the items from an interface to a product catalog.

As a customer proceeds through a store, the method 400a may be executed periodically such that the method 400a is executed effectively continuously, such as 1 to 10 times a second. For a given iteration of the method 400a, the customer's current location may be determined 404. This may include obtaining an estimate of the customer's location from a global positioning system (GPS) receiver included in the user computing device 104a or receiving a signal from transmitters installed throughout a store, where the signal from one or more transmitters may be decoded by the user computing device 104a to infer a location of the user computing device 104a.

Using the determined 404 current location, a listing of merchandise stocked at that location may be identified 406. The merchandise retrieved may be that which is within X meters of the customer's determined 404 location. In some embodiments, a database may store a stocking location for each product or for each class of products. Accordingly, those products with a location within X meters of the driver's current location may be obtained from this database to obtain a list of proximate products.

The proximate products may be compared 408 to a purchase history of the customer and matching products may be identified 410. For example, matching products found both among the proximate products and the purchase history may be identified 410. In some embodiments, only the customer's recent purchase history is used, e.g. the last N months. In some embodiments, the purchase history is stored or accessed by the server system 102a and accessed by whichever device is performing the comparison. The purchase history of a customer may be known due to self-identification of the customer at the time of conducting a transaction and the transaction may be associated with the account of the customer or otherwise stored with an identifier of the customer, such as by a server system 102a. The purchase history may also be known by some other means, such as by means of the customer reporting transactions to the server system 102a which then associates the reported transactions with an account of the customer. By whichever means reported, a transaction for a customer may list a date and the items purchased in the transaction, including a quantity for the items.

The method 400a may include detecting 412 movement away from the current location. Upon detecting 412 departure or intent to depart, the method 400a may include evaluating 414 whether an identified 410 matching product is already found in the cart, such as the electronic shopping cart. If so, then the method 400a may end. If not, then the method 400a may include generating 416 an alert that is perceptible to the customer and that identifies the matching product. For example, generating 416 the alert may include displaying the interface 300 on the user computing device 104a with information corresponding to the matching product or adding the matching product to a list having elements that are selectable to invoke display of the interface 300 with respect to one or more products. In some embodiments, the method 400a may also include generating 418 and displaying messages communicating a promotion for a product known to be related to a matching product and for the matching product itself. For example, a coupon or link to a coupon for a product or a related product may be generated and displayed.

Figure 4B:
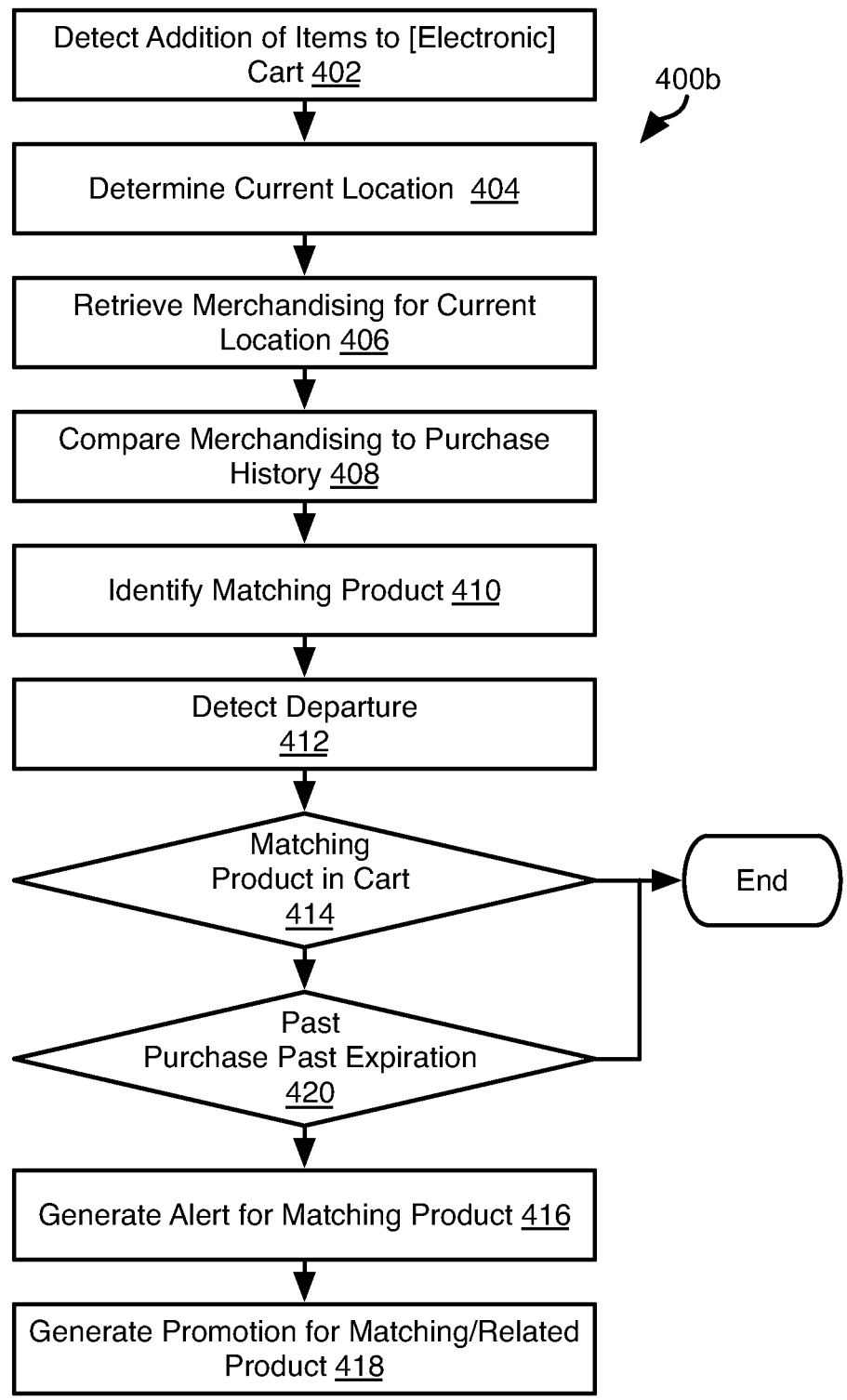

FIG. 4B illustrates an alternative method 400b to generate alerts for a customer. The steps 402-414 of the method 400b may be the same as for the method 400a. As shown in FIG. 4B, in the circumstance where a matching product is not found 414 to be in the cart upon detecting 412 departure, the method 400b may include evaluating 420 whether the previously purchase product is past its expiration date. For example, the method 400b may include evaluating 420 whether the time elapsed since the matching product was purchase is greater than the shelf life or expiration period for that product. In some embodiments, the method may instead evaluate 420 whether the elapsed time is within a threshold period of ending of the expiration period for the product. For example, if a previously purchased product will expire within N days (e.g. 1-3) from the current date, then the method 400b may proceed to step 416.

If the matching product is not found 420 to have past its expiration date or found 420 to be within a threshold time from passing its expiration date, then the method 400b may end. Otherwise, the method 400b may include one or both of generating 416 an alert and generating 418 a promotion as described above with respect to the method 400a.

Figure 4C:
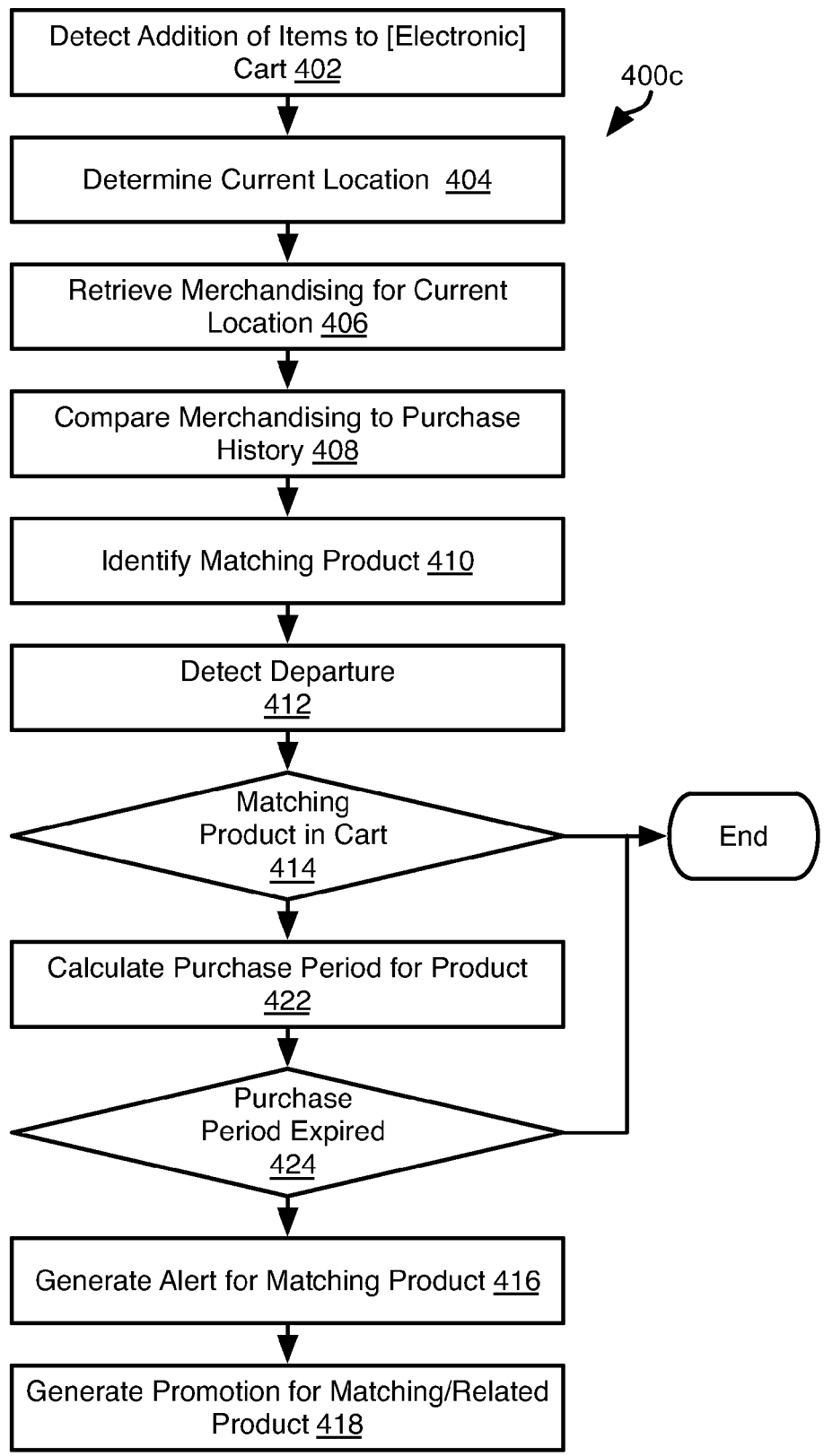

FIG. 4C illustrates an alternative method 400c that may be executed to generate alerts for a customer. The steps 402-414 of the method 400c may be the same as for the method 400a. As shown in FIG. 4C, in the circumstance where a matching product is not found 414 to be in the cart upon detecting 412 departure, the method 400b may include calculating 422, or retrieving a previously calculated, purchase period for the matching product. The method 400c may advantageously be used for products that are consumed on a regular basis but do not expire within a short time period, e.g., canned goods or other goods with a very long shelf life. For example, if a purchase history indicates that on average the customer purchases the matching product every N days, then the purchase period is N days. In some embodiments, where insufficient purchase history exists to establish a purchase period for the customer, the average purchase history for the general population, or a same demographic group as the customer may be used as the purchase period.

The method 400c may further include evaluating 424 whether an amount of time equal to the purchase period has elapsed since a previous purchase of the product, as reflected by the purchase history of the customer. In some embodiments, the method may instead evaluate 424 whether the elapsed time since the last purchase is within a threshold amount of the purchase period. For example, if the elapsed time since a previous purchase is within N days (e.g. 1-3) of the purchase period, then the method 400c may proceed to step 416.

If the elapsed time from the previous purchase is found 424 to exceed or be within a threshold amount from the purchase period, then one or both of the steps 416 and 418 may be executed as for the method 400a.

The illustrated methods 400a-400c may be used to exclusion of one another, or some or all of them may be executed by the same system. For example, the method 400b may be used with products that expire (e.g. dairy, meat, and produce) and the method 400c may be used for products, including products other than food, that are consumed regularly but do not expire in a short period of time.

Figure 5:
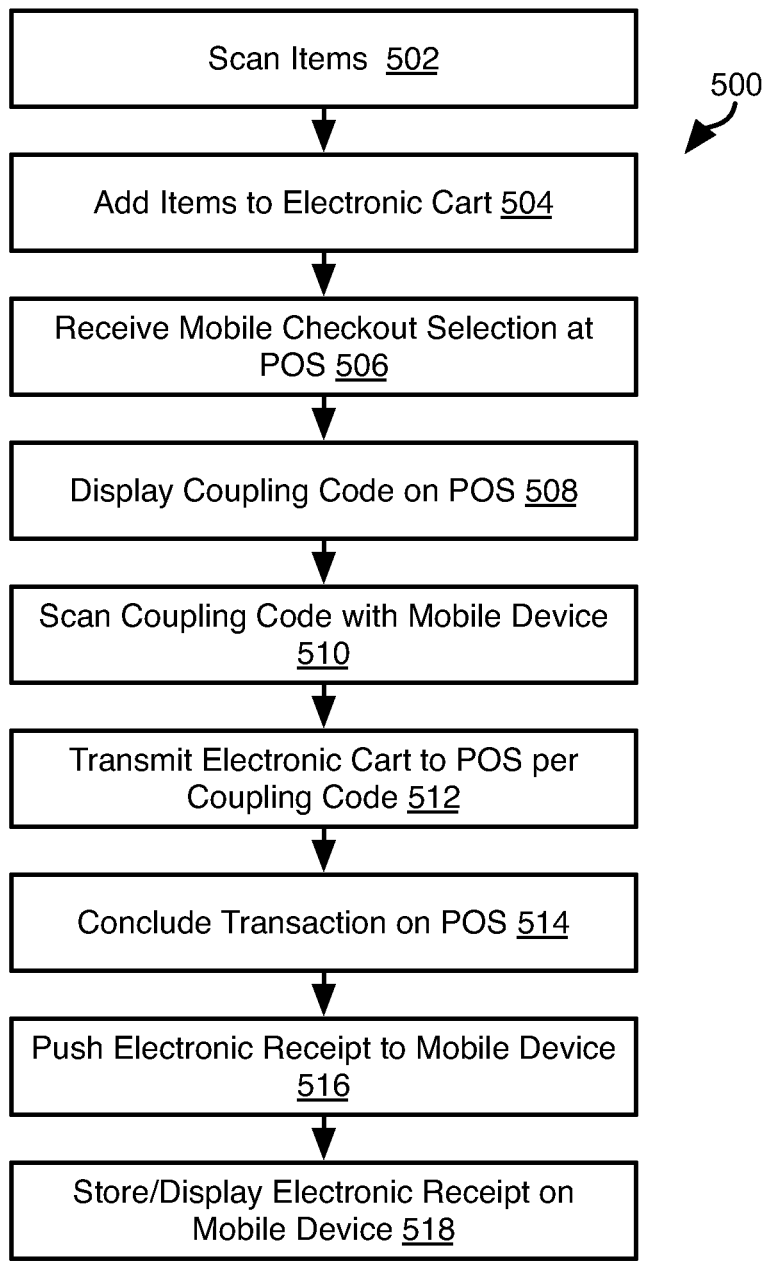
FIG. 5 is a process flow diagram of a method for conducting an in-store transaction using an electronic shopping cart in accordance with an embodiment of the invention.

FIG. 5 illustrates an example method 500 for conducting an in-store transaction using an electronic shopping cart. The items in the electronic shopping cart may be added by the user scanning the items using the user computing device 104a. The user may add the items to the electronic cart in response to alerts generated according to the methods 400a-400c, such as by means of the interface 300.

In conventional ecommerce transactions, an electronic shopping cart is assembled online, electronic payment is processed, and then shipping of the purchased products is authorized. In the illustrated method 500, an electronic shopping cart is populated by scanning items in a store with a user computing device 104a as described above.

In the illustrated method 500, items are scanned 502 and added 504 to an electronic shopping cart, such as according to the methods described hereinabove. At a POS 106a, a request may be received 506 to use mobile self checkout (MSCO). This may be communicated verbally to a cashier who then inputs or otherwise specifies the MSCO option to the POS 106a. In response to receipt of this instruction, the POS 106a, generates and displays a code that is used to couple a particular user computing device to that POS 106a. The displayed code may be a one-off code that is generated for each transaction or otherwise used for only one transaction.

The user computing 104a scans 510 the displayed coupling code. The user computing device then transmits 512 the contents of the electronic cart to the POS 106a using the coupling code. This coupling code may be an address that can be used to transmit the contents of the electronic shopping cart directly to the POS 106a. Alternatively, the contents of the cart with the coupling code may be transmitted with the coupling code to the global server system 102a. The global server system 102a may then interpret the coupling code to identify the POS 106a that generated the coupling code and transmit the contents of the electronic shopping cart to this POS 106a.

The contents of the electronic shopping cart received by the POS 106a may then be used to conclude 514 the transaction on the POS 106a. The items received by the POS 106a may, for example, may treated in the same manner as items input to the POS 106a by scanning bar codes in the conventional manner. Likewise, concluding 514 the transaction may include receiving tender of cash, check, or electronic payment, as for the typical in-store transaction.

In some embodiments, the POS 106a may simply invoke printing of a paper receipt after concluding 514 the transaction. In some embodiments, the POS 106a may additionally or alternatively push 516 an electronic receipt to the user computing device 104a. For example, the contents of the electronic shopping cart received by the POS 106a may be accompanied by a user identifier. This user identifier may then be used by the POS 106a to route an electronic receipt to the user computing device 104a and/or associated the electronic receipt with a user account associated with the user identifier. A user computing device 104a upon receiving the pushed electronic receipt, the user computing device may one or both of store 518 the electronic receipt and display the receipt on the user computing device 104a.

Inasmuch as the methods described hereinabove provide an awareness of the current location of a customer, the methods disclosed above may be used in combination with methods for providing navigational aids for shoppers to assist shoppers in finding items on a shopping list in a store. For example, the methods described herein may be used in combination with the methods disclosed in U.S. patent application Ser. No. 13/650,559 filed Oct. 12, 2012 and entitled Techniques for Optimizing a Shopping Agenda, U.S. patent application Ser. No. 13/650,652 filed Oct. 12, 2012 and entitled Techniques for Optimizing a Shopping Agenda and U.S. patent application Ser. No. 13/650,723 filed Oct. 12, 2012 and entitled Techniques for Optimizing a Shopping Agenda, which are hereby incorporated herein by reference in their entirety for all purposes.

Figure 6:
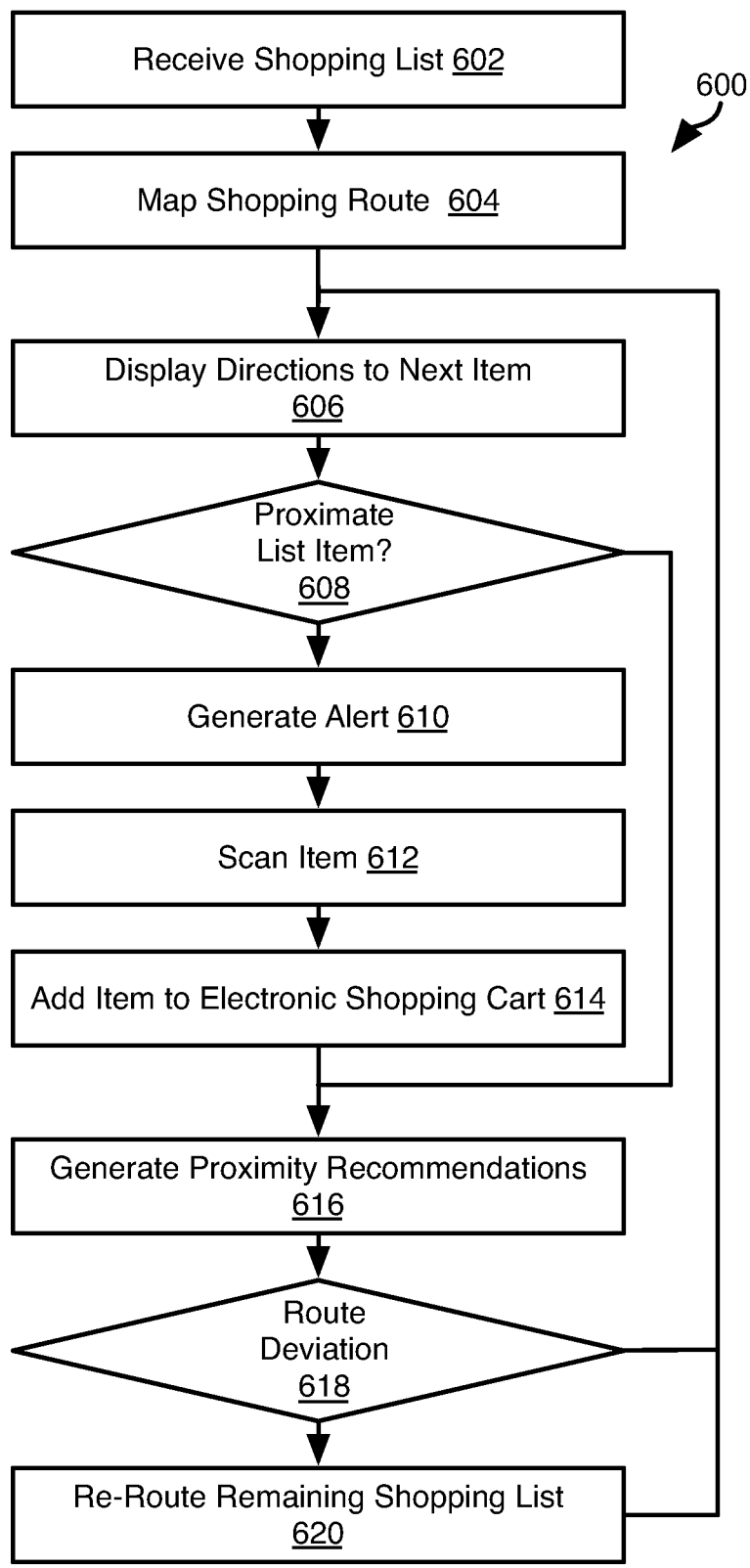
FIG. 6 is a process flow diagram of a method for guiding a customer to items on a shopping list in accordance with an embodiment of the invention.

FIG. 6 illustrates an example method 600 that may be used to provide navigational aid to a shopper. The method 600 may be executed on a server system 102a or 102b with an interface provided on the user computing device 104a. The method 600 may include receiving 602 a shopping list specifying a plurality of items. The items may be found in an index or database that relates items to a location within a store. Using this information, a route is mapped 604 that passes by the location of each of the items. The database may additionally include a floor plan of the store that identifies obstacles such as shelves, pillars, display cases, and the like. Accordingly, mapping 604 a route for the items may include defining a route that passes by each item and that guides the customer around these obstacles. The route may be optimized to reduce the distance and time required to retrieve the items in the shopping list, such as according to the methods described in U.S. patent application Ser. No. 13/650,652, or in a manner that preserves the freshness of perishable, frozen, and refrigerated items.

Using the initial route, the method 600 may include displaying 606 on the user computing device 104a directions to the next item in the route, which is the first item in the route for the first iteration. In some embodiments, when the customer arrives proximate a list item, such as within X meters of the location for the item, an alert may be generated 610. The user computing device 104a may also be used to scan 612 the item and add 614 the items to an electronic shopping cart. In some embodiments, the shopping list may be defined using an interface that has sufficient information to add the items to the electronic shopping cart. In such embodiments, rather than scan 612 items and add 614 them to the shopping cart, a user may select an item from the shopping list using the interface 104a and indicate that the item has been retrieved for purchase in order to invoke addition 614 of the item to the electronic shopping cart.

In the course of executing method 600 alerts may be generated 616 according to the methods of some or all of FIGS. 4A-4C described hereinabove for proximate items that a user might be interested in purchasing and that may not be on the shopping list.

Where user is found 618 to deviate from the shopping route, then the method 600 may include re-routing the remaining of the shopping lists, i.e., generating a new route in the same manner as for step 604 using the remaining items of the shopping list and the customer's current location as the starting point. The method 600 may continue at step 606 and repeat until all items in a shopping list are added 614 to an electronic shopping cart, a customer checks out, or otherwise indicates that a shopping trip has ended or provision of navigational aids is no longer needed.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for facilitating shopping, the method comprising:
   providing one or more sale devices within a store;
   providing a server system in communication with the one or more sale devices and one or more customer computers via a network;
   providing an interface for installation on a customer computer of a customer;

storing in a database a stocking location for each product or for each class of products within the store;

detecting, with the one or more customer computers, a current location of a customer in the store;

detecting, with the customer computer of the customer, addition of products to a shopping cart of the customer by detecting a radio frequency identification (RFID) signal for each of the products wherein the shopping cart is a physical shopping cart;

identifying, with the server system, a listing of products from the database stocked within X meters of the current location of the customer using the determined current location of the customer;

comparing the stocked products within the X meters of the current location to a purchase history of the customer and identifying matching products;

detecting, with the server system, a need of the customer for at least one needed matching product stocked within the X meters of the current location and included in the purchase history of the customer;

detecting, with the customer computer, movement of the customer computer away from the current location from a global positioning system receiver included in the customer computer or by receiving a signal from one or more transmitters installed throughout the store, where the signal from one or more transmitters may be decoded by the customer computer to infer a location of the customer computer;

evaluating, with the customer computer, whether the at least one needed matching product is already found in the shopping cart of the customer, by failure of the customer computer to detect the radio frequency identification (RFID) signal for the at least one needed matching product from within the shopping cart;

detecting, with the customer computer, failure of the customer to add the at least one needed matching product to the shopping cart;

generating, with the server system communicating the failure to the customer computer, an alert perceptible by the customer to identify the at least one needed matching product; and wherein the interface includes an indicator that communicates the alert comprising a message to the customer with respect to the at least one needed matching product and displays the message suggesting that the customer add the at least one needed matching product to the shopping cart of the customer, and a plurality of interface elements for displaying a map indicating a current location of the customer, a location of the least one needed matching product, a path leading the customer to the at least one needed matching product, and a simple indicator of a direction that the customer should turn in order to reach the at least one needed matching product, displaying a product image of the at least one needed matching product, displaying an electronic coupon for the at least one needed matching product, displaying information for other products related to the at least one needed matching product, displaying product information of the at least one needed matching product or other product information, displaying the purchase history of the at least one needed matching product, displaying a shopping list including adding the at least one needed matching product to the shopping list or invoking navigational aids for retrieving items of the shopping list, and displaying the addition of the at least one needed product to the shopping cart or the managing of the shopping cart.

2. The method of claim 1, wherein detecting, with the server system, failure of the customer to add the at least one needed matching product to the cart further comprises:

detecting, with the server system, movement of the customer away from the location without having added the needed matching product to the shopping cart.

3. The method of claim 2, wherein detecting, with the server system, movement of the customer away from the location without having added the needed matching product to the shopping cart further comprises detecting movement of the one or more customer computers away from the location without detecting addition of the needed matching product to the shopping cart accessed by the customer computer.

4. The method of claim 1, wherein generating, with the server system communicating the failure to the customer computer, the alert perceptible by the customer and identifying the needed matching product further comprises displaying, to the customer, a promotion for the needed matching product.

5. The method of claim 1, wherein generating, by the customer computer, the alert perceptible by the customer and identifying the needed matching product further comprises displaying, to the customer, a promotion for a related product for the needed matching product.

6. The method of claim 1, wherein generating, with the server system communicating the failure to the customer computer, the alert perceptible by the customer and identifying the needed matching product further comprises displaying, to the customer, directions to the needed matching product.

7. The method of claim 1, wherein detecting, with the server system, the need of the customer for the at least one needed matching product stocked within the X meters of the current location and included in a purchase history of the customer further comprises:

determining from the purchase history an elapsed time since a last purchase of a nearby product stocked within the X meters of the current location of the customer; and if the elapsed time exceeds an expiration period for the nearby product, identifying the nearby product as the at least one needed matching product.

8. The method of claim 1, wherein detecting, with the server system, the need of the customer for the at least one needed matching product stocked within the X meters of the current location and included in a purchase history of the customer further comprises:

determining from the purchase history a typical purchase period for a nearby product stocked within the X meters of the current location of the customer; and if the elapsed time exceeds the typical purchase period for the nearby product, identifying the nearby product as the at least one needed matching product.

9. A system for facilitating shopping, the system comprising:

one or more sale devices within a store;

a server system in communication with the one or more sale devices and one or more customer computers;

a database in communication with the server system and having a stocking location for each product or for each class of products within the store;

an interface installed on a customer computer of a customer;

the server system communicating with the customer computer via a network and the customer computer including a processor configured to:

detect a current location of a customer in the store;

detect addition of products to a shopping cart of the customer by detecting a radio frequency identification (RFID) signal for each of the products if the shopping cart is a physical shopping cart;

the server system including a processor configured to:

identify a listing of products from the database stocked within X meters of the current location of the customer using the determined current location of the customer;

compare the stocked products within the X meters of the current location to a purchase history of the customer and identifying matching products;

detect a need of the customer for at least one needed matching product stocked within the X meters of the current location and included in the purchase history of the customer;

the processor of the customer computer being further configured to:

detect movement of the customer computer away from the current location from a global positioning system receiver included in the customer computer or by receiving a signal from one or more transmitters installed throughout the store, where the signal from one or more transmitters may be decoded by the customer computer to infer a location of the customer computer;

evaluate whether the at least one needed matching product is already found in the shopping cart of the customer;

detect failure of the customer to add the at least one needed matching product to the shopping cart as a failure by the customer computer to detect the radio frequency identification (RFID) signal for the needed matching product from within the shopping cart;

the processor of the server system being further configured to generate an alert perceptible by the customer to identify the at least one needed matching product; and wherein the interface includes an indicator that communicates the alert comprising a message to the customer with respect to the at least one needed matching product and displays the message suggesting that the customer add the at least one needed matching product to the shopping cart of the customer, and a plurality of interface elements for displaying a map indicating a current location of the customer, a location of the least one needed matching product, a path leading the customer to the at least one needed matching product, and a simple indicator of a direction that the customer should turn in order to reach the at least one needed matching product, displaying a product image of the at least one needed matching product, displaying an electronic coupon for the at least one needed matching product, displaying information for other products related to the at least one needed matching product, displaying product information of the at least one needed matching product or other product information, displaying the purchase history of the at least one needed matching product, displaying a shopping list including adding the at least one needed matching product to the shopping list or invoking navigational aids for retrieving items of the shopping list, and displaying the addition of the at least one needed product to the shopping cart or the managing of the shopping cart.

10. The system of claim 9, wherein the processor of the customer computer is configured to detect failure of the customer to add the at least one needed matching product to the shopping cart by detecting movement of the customer away from the location without having added the needed matching product to the cart.

11. The system of claim 10, wherein the processor of the customer computer is configured to detect movement of the customer away from the location without having added the needed matching product to the shopping cart by detecting movement of the customer computer away from the location without detecting addition of the needed matching product to the shopping cart accessed by the customer computer.

12. The system of claim 9, wherein the processor of the server system is configured to generate the alert perceptible by the customer and identifying the needed matching product by displaying, to the customer, directions to the needed matching product.

13. The system of claim 9, wherein the processor of the server system is configured to detect the need of the customer for the at least one needed matching product stocked within the X meters of the current location and included in a purchase history of the customer by:
  determining from the purchase history an elapsed time since a last purchase of a nearby product stocked proximate the location of the customer; and
  if the elapsed time exceeds an expiration period for the nearby product, identifying the nearby product as the at least one needed matching product.

14. The system of claim 9, wherein the processor of the server system is configured to detect the need of the customer for the at least one needed matching product stocked within the X meters of the current location and included in a purchase history of the customer by:
  determining from the purchase history a typical purchase period for a nearby product stocked proximate the location of the customer; and
  if the elapsed time exceeds the typical purchase period for the nearby product, identifying the nearby product as the at least one needed matching product.

* * * * *